3,191,750
CONVEYOR LOADING AND UNLOADING SYSTEM
Dallas B. Lewis, 2015 Whitley Ave., Hollywood, Calif.
Filed Nov. 30, 1962, Ser. No. 241,333
14 Claims. (Cl. 198—31)

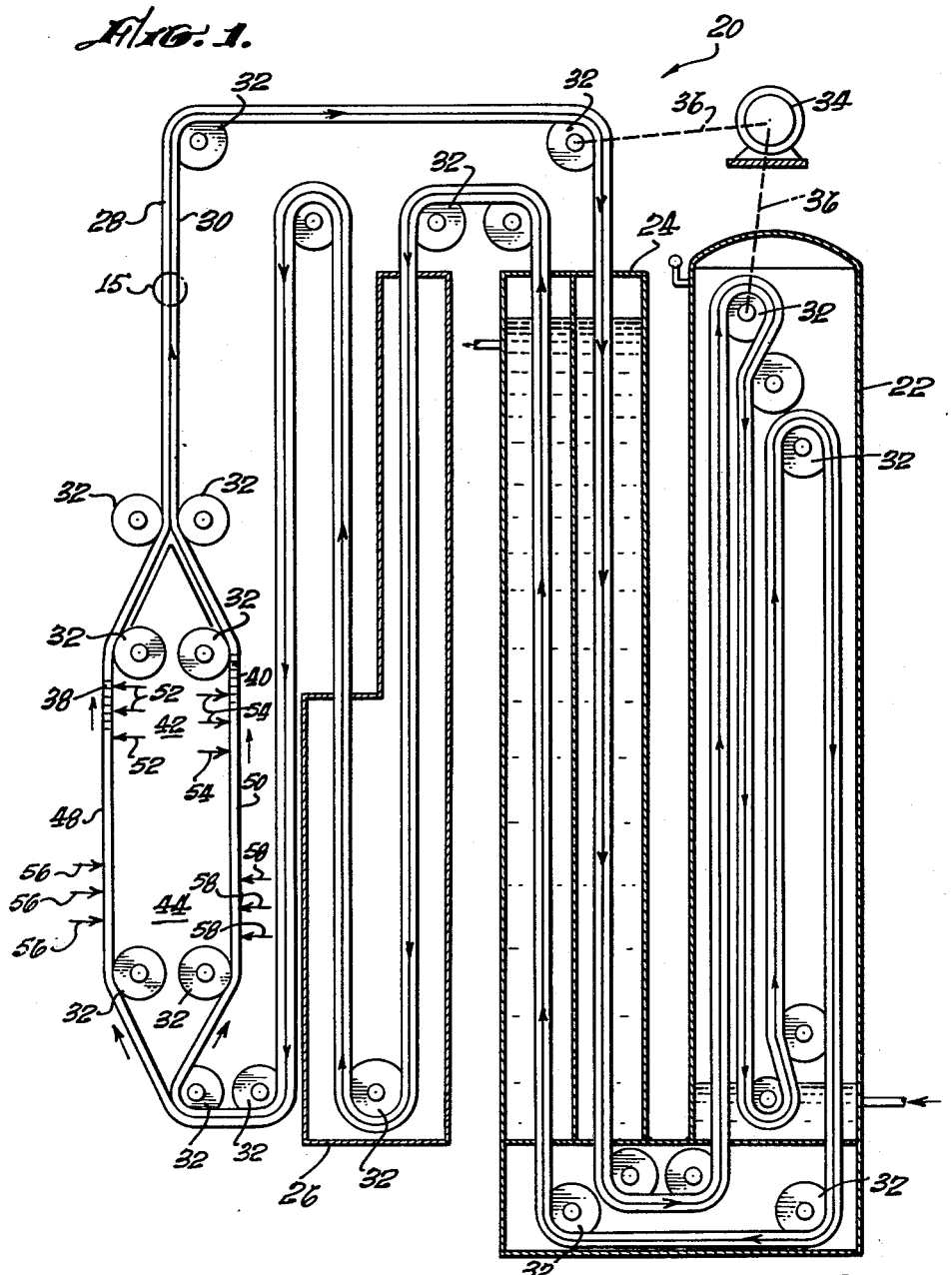

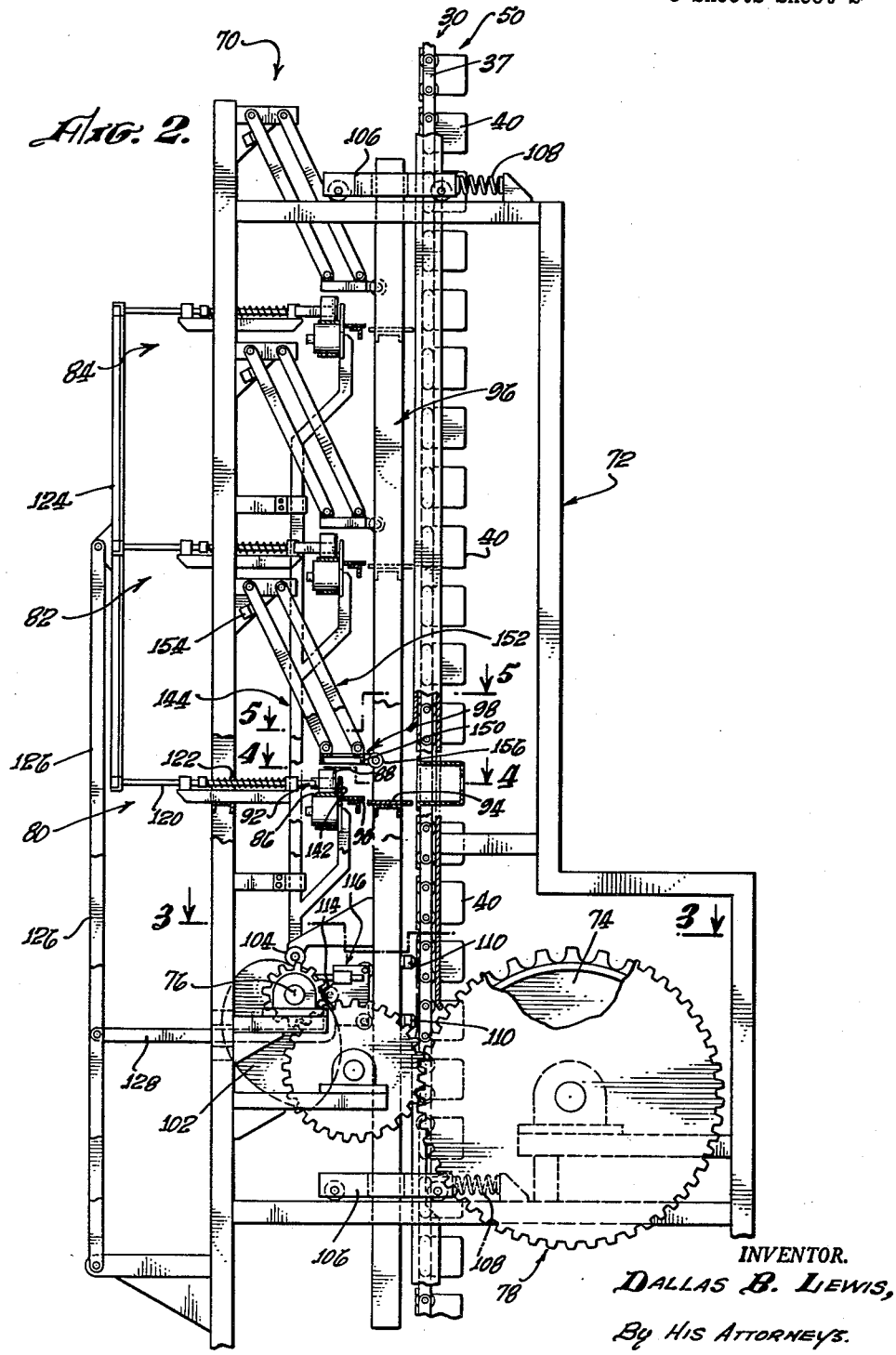

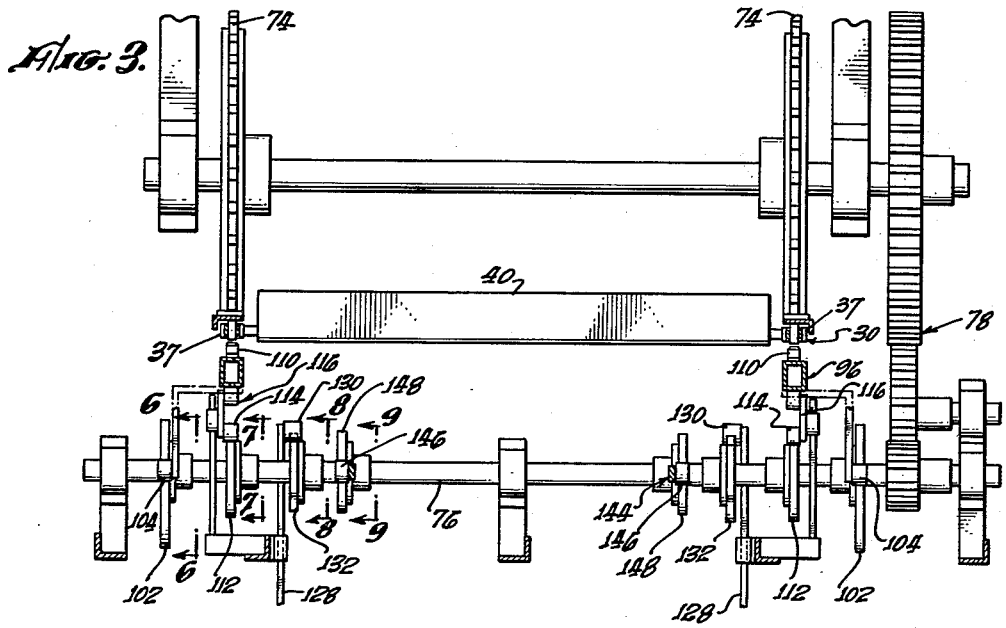
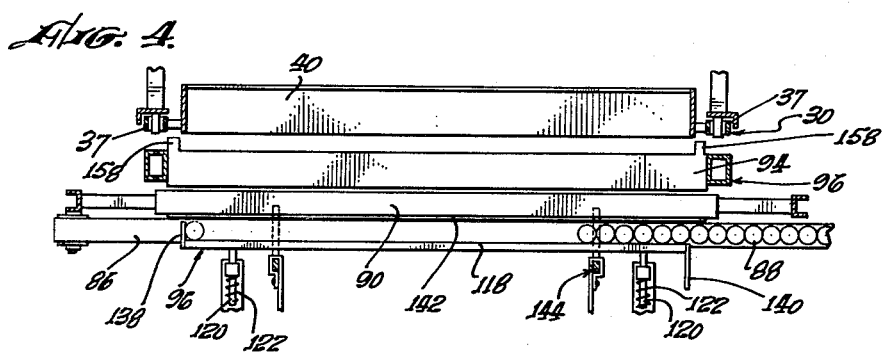
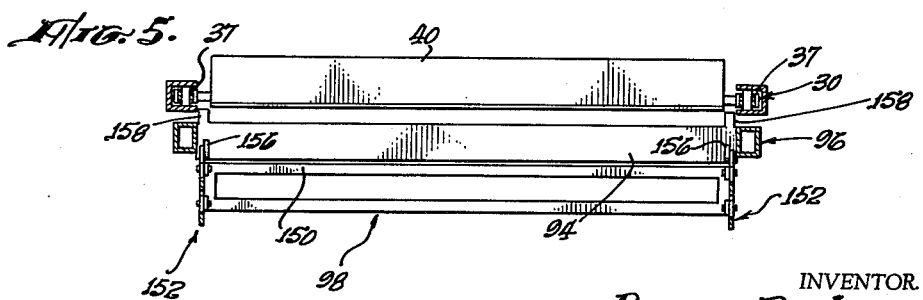

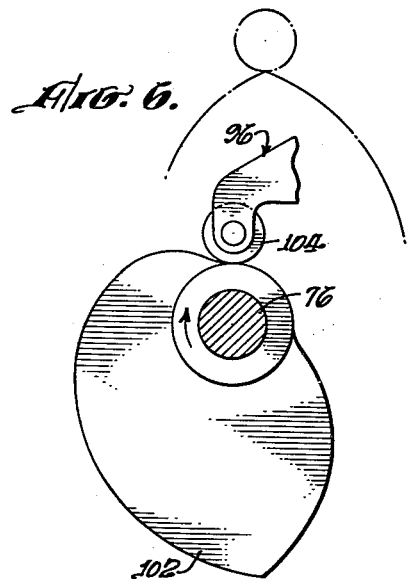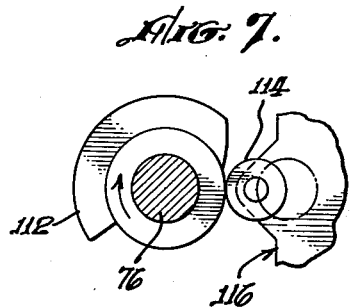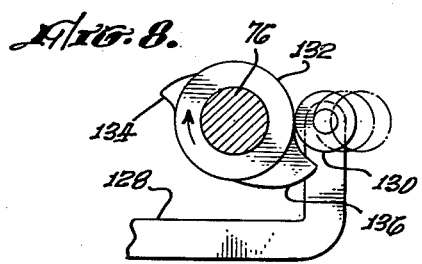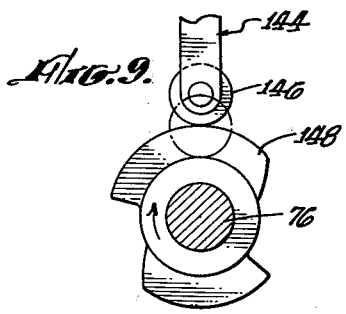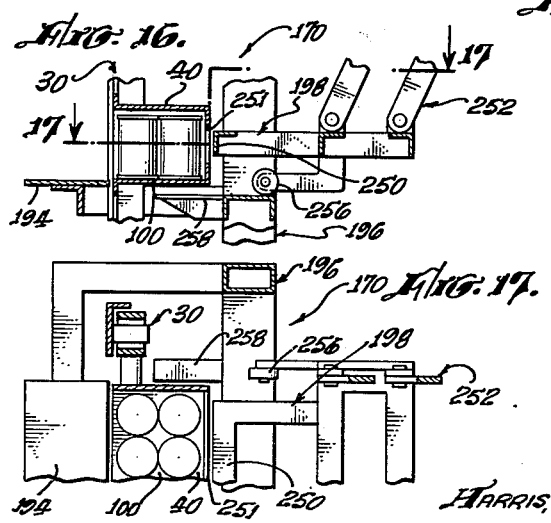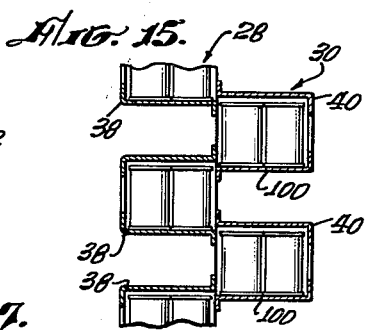
DALLAS B. LEWIS,
INVENTOR.
BY HIS ATTORNEYS.
HARRIS, KIECH, RUSSELL & KERN.

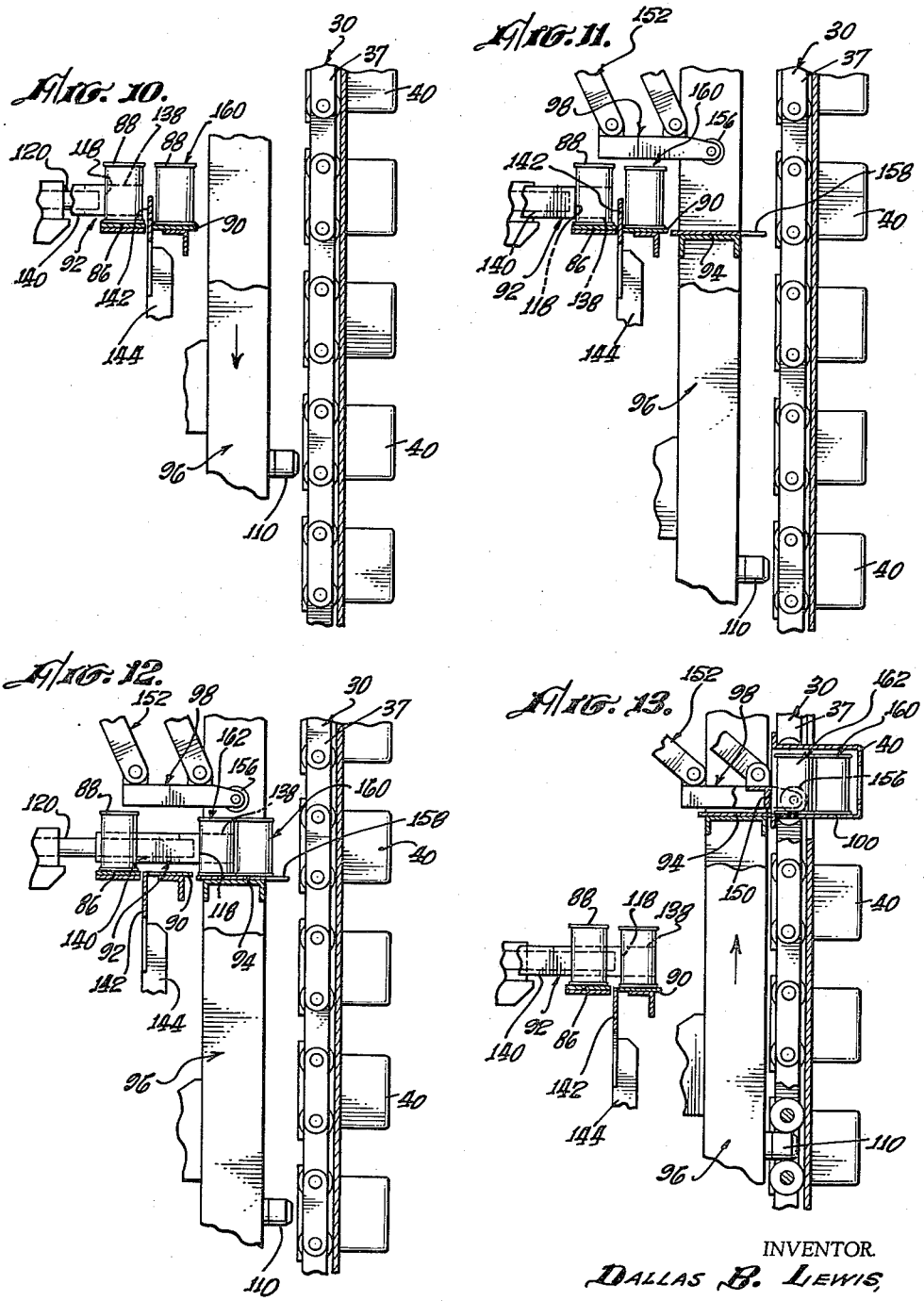

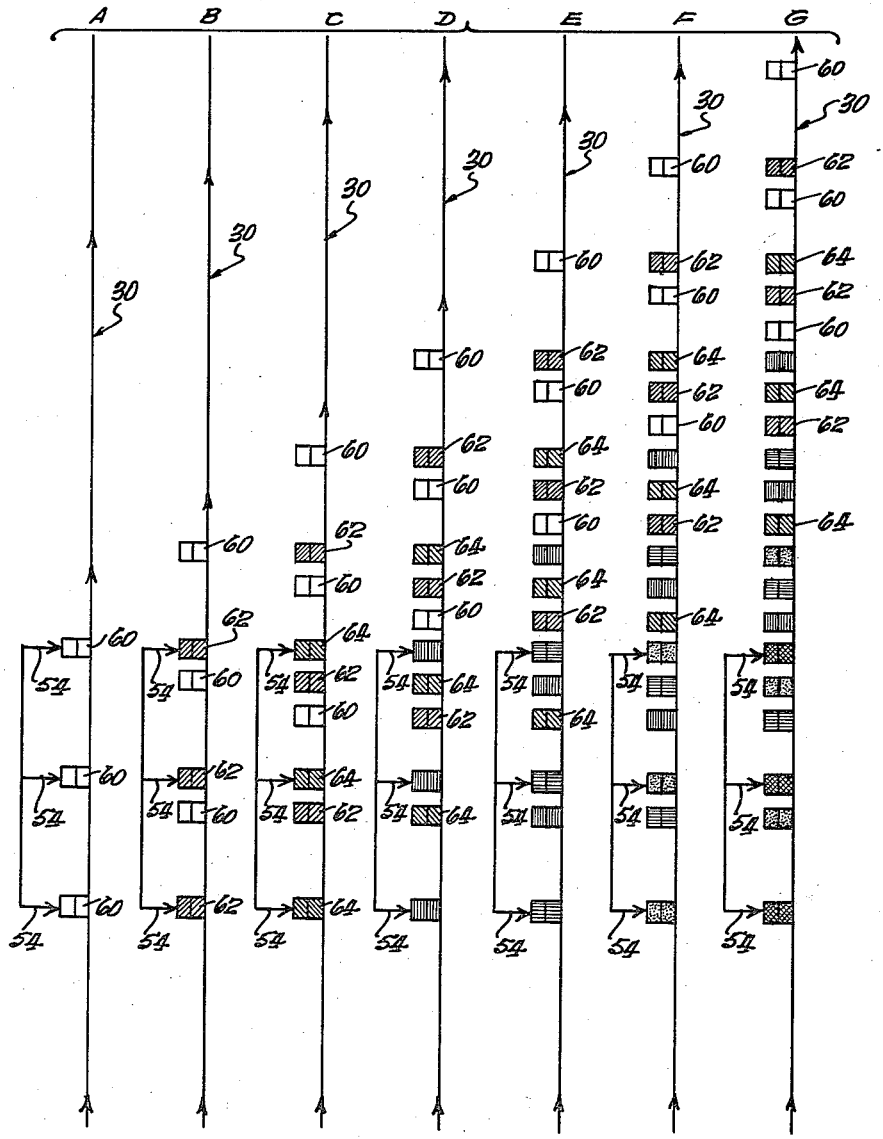

The present invention relates in general to conveyor systems and, more particularly, to apparatus for loading and unloading carriers mounted on a conveyor during movement of the carriers along an upright, generally vertical run of the conveyor.

Since the invention is particularly applicable to loading and unloading carriers on endless conveyors of hydrostatic sterilizers utilized in cooking and/or sterilizing the contents of cans, or other containers, it will be considered in such connection herein as a matter of convenience.

Considered generally, the invention contemplates a hydrostatic sterilizer which includes two chain-type conveyors having open-sided carriers spaced apart therealong. The open sides of the carriers on the two conveyors face each other and, except during loading and unloading, the open sides of the carriers on the respective conveyors are disposed in abutting relation to retain such containers as cans, or other articles, within the carriers. During loading and unloading of the carriers, the two conveyors move through laterally separated, upright runs so that the carriers may be loaded and unloaded through the open sides thereof.

General objects of the invention are to provide means for loading and unloading several carriers on the two conveyors simultaneously as they move along their laterally separated, upright runs to increase the time available for loading and unloading for a given conveyor speed, and to provide means for loading the carriers with double rows of cans, or other containers, and for unloading such double rows. Providing a container system wherein each carrier receives a double row is particularly important since it doubles the capacity of the equipment for the same operating conditions.

Considering the invention more specifically, an important object is to provide a loading or unloading apparatus for each carrier conveyor which includes: an elevator adjacent and movable parallel to the upright run of such conveyor and having a generally horizontal, container supporting means or shelf registerable with one of the carriers during movement of the conveyor through its upright run; means for moving the elevator in synchronism with movement of the conveyor through its upright run and with the container supporting shelf on the elevator in register with one of the carriers on the conveyor; and means for transferring containers between the container supporting shelf on the elevator and the registering carrier on the conveyor during such synchronized movement of the elevator and the conveyor. A related object is to provide the elevator with a plurality of vertically spaced, container supporting shelves and to provide a plurality of transfer means for transferring containers between the container supporting shelves and registering carriers on the conveyor, whereby a plurality of the carriers may be loaded or unloaded simultaneously.

A further object is to insure synchronous movement of the elevator and the conveyor during the loading or unloading operation by mechanically interlocking the elevator and the conveyor.

Still another object is to provide a transfer means for transferring containers between the container supporting shelves and registering carriers which is actuable by the elevator during synchronous movement of the elevator and the conveyor.

Yet another object is to provide a transfer means of the foregoing nature which includes laterally-movable pusher means and means engageable with the elevator for laterally moving the pusher means, the transfer means including parallelogram linkage means supporting the pusher means so as to produce straight-line lateral movement of the pusher means relative to a fixed reference during synchronous movement of the elevator and the conveyor.

Another and important object of the invention is to provide means for forming a single line of containers into a double row thereof for subsequent transfer to a container carrier on the upright conveyor run, which includes: a generally horizontal conveyor adapted to convey a single line of containers; container supporting means paralleling the horizontal conveyor on one side thereof, which supporting means may be one of the container supporting shelves on the elevator hereinbefore discussed; container receiving means between the horizontal conveyor and the supporting means; pusher means movable laterally across the horizontal conveyor from a retracted position on the other side of the horizontal conveyor to a first extended position, and movable laterally across the horizontal conveyor and the receiving means from its retracted position to a second extended position; means for moving the pusher means from its retracted position to its first extended position, so as to push a first row of containers from the single line on the horizontal conveyor onto the receiving means, and for then returning the pusher means to its retracted position; and means for subsequently moving the pusher means from its retracted position to its second extended position, so as to push a second row of containers from the single line on the horizontal conveyor across the receiving means onto the supporting means, and so as to push the first row of containers from the receiving means onto the supporting means ahead of the first row to form a double row of containers on the supporting means, and for then returning the pusher means to its retracted position.

Another object is to provide, in such a double-row forming means, stop means for preventing movement of the single line of containers on the horizontal container past the downstream end of the pusher means, and stop means on the pusher means at the upstream end thereof for intercepting the single line of containers when the pusher means is in either of its extended positions.

Still another object is to provide a double-row forming means of the foregoing character including a guard movable from a retracted position into an extended position wherein it is interposed between the receiving means and the horizontal conveyor to confine the single line of containers on the horizontal conveyor between the pusher means and the guard, and means for moving the guard into its extended position in response to movement of the pusher means into its retracted position, and for moving the guard into its retracted position prior to movement of the pusher means from its retracted position to either of its extended positions. Such guard thus prevents buckling of the single line of containers on the horizontal container when such single line encounters the stop means at the downstream end of the pusher means, by confining the single line between the pusher means and the guard.

The foregoing objects, advantages, features and results of the present invention, together with various other objects, advantages, features and results thereof which will be evident to those skilled in the conveyor art in the light of this disclosure, may be achieved with the exemplary embodiments of the invention described in detail hereinafter and illustrated in the accompanying drawings, in which:

FIG. 1 is a semidiagrammatic view of a hydrostatic sterilizer incorporating an endless, carrier conveyor system which embodies the carrier loading and unloading apparatus of the invention;

FIG. 2 is a fragmentary side elevational view, partially in section, showing a carrier loading apparatus of the invention for simultaneously loading a plurality of carriers on one of the conveyors of a dual-conveyor system;

FIG. 3, 4 and 5 are sectional views respectively taken along the arrowed lines 3—3, 4—4 and 5—5 of FIG. 2 of the drawings;

FIGS. 6, 7, 8 and 9 are enlarged, fragmentary sectional views respectively taken along the arrowed lines 6—6, 7—7, 8—8 and 9—9 of FIG. 3 of the drawings;

FIGS. 10, 11, 12 and 13 are fragmentary views, partially in side elevation and partially in vertical section, illustrating the forming of a double row of containers, the transfer of such double row to a container supporting means or shelf on an elevator, and the transfer of the double row of containers from the elevator to a container carrier on an upright conveyor run;

FIG. 14 is a diagrammatic view illustrating the pattern in which the loading apparatus of the invention loads containers into container carriers on an upright conveyor run;

FIG. 15 is an enlarged, fragmentary sectional view taken in the region designated by the circle 15 in FIG. 1 of the drawings;

FIG. 16 is a fragmentary view, partially in side elevation and partially in vertical section, illustrating an apparatus of the invention for unloading containers from a conveyor-mounted carrier during movement of the conveyor through a vertical run; and FIG. 17 is a sectional view taken along the arrowed line 17—17 of FIG. 16 of the drawings.

General description

Referring initially to FIG. 1 of the drawings, illustrated therein is a hydrostatic sterilizer 20 which includes a sterilizing tower 22, a hydrostatic tower 24 for maintaining pressure in the sterilizing tower, and a cooling tower 26. The sterilizer 20 includes two chain-type conveyors 28 and 30 which are trained around and guided through the sterilizer by sprockets 32. The conveyors 28 and 30 are driven by a drive motor 34 connected to certain of the sprockets 32, as indicated by the broken line connections 36.

Each of the conveyors 28 and 30 includes two parallel chains, the chains of the conveyor 30 being best shown in FIGS. 3 to 5 of the drawings and being designated by the numeral 37. Spanning the spaces between and mounted on the respective chains of the conveyors 28 and 30 are open-sided carriers 38 and 40 adapted to receive cans, or other containers, the contents of which are to be cooked and/or sterilized. The carriers 38 and 40 are spaced apart along the respective conveyors 28 and 30 and are mounted thereon with their open sides facing each other, as best shown in FIG. 15 of the drawings. Except in loading and unloading stations 42 and 44, the chains of the conveyors 28 and 30 are disposed in side-by-side relation, with the chains of one of the conveyors disposed between the chains of the other, the sprockets 32 over which the respective chains of the two conveyors are trained all of the same dameter. This maintains the open sides of the carriers 38 and 40 in abutting relation, as shown in FIG. 15 of the drawings, so that the carriers on each conveyor act to retain cans, or other containers, within the carriers on the other. Preferably, the carriers 38 and 40 on the respective conveyors 28 and 30 are staggered relative to each other so that they are overlapped in the manner shown in FIG. 15.

Again excepting the loading and unloading stations 42 and 44, the conveyors 28 and 30 move in unison through the hydrostatic sterilizer 20. More particularly, the conveyors 28 and 30 move in unison from the loading station 42, as indicated by the arrows on the conveyors, downwardly through the hydrostatic tower 24, then through several vertical runs in the sterilizing tower 22, then upwardly through the hydrostatic tower 24, then along two vertical runs in the cooling tower 26, and thence to the unloading station 44. The contents of the cans in the carriers 38 and 40 are preheated as they move downwardly through the hydrostatic tower 24, are then cooked and/or sterilized in the sterilizing tower 22, are then precooled as they move upwardly through the hydrostatic tower 24, and are then subjected to a final cooling operation in the cooling tower 26 prior to arrival at the unloading station 44.

In the loading and unloading stations 42 and 44, the conveyors 28 and 30 are laterally separated by certain of the sprockets 32 into laterally spaced, generally vertical, upright runs 48 and 50. This separates the carriers 38 and 40 for the purpose of loading and unloading them through the open sides thereof, which open sides continue to face each other. As indicated by the trinities of arrows 52 and 54, three carriers 38 and three carriers 40 are loaded simultaneously in a manner to be described hereinafter. Similarly, as indicated by the two trinities of arrows 56 and 58, the carriers 38 and 40 are simultaneously unloaded in groups of three. Loading and unloading the carriers 38 and 40 three at a time in this fashion increases the time available for loading and unloading for a given conveyor speed, which is an important feature. It will be understood that the invention is not limited to loading and unloading three carriers at a time, although it is important that the carriers be loaded and unloaded two or more at a time to permit loading and unloading at higher conveyor speeds.

The loading pattern for the conveyor 30 is illustrated in FIG. 14 of the drawings and will be described at this point to provide a better understanding of the loading apparatus to be described hereinafter. As shown in column A of FIG. 14, three double rows of containers 60 are loaded into a corresponding number of the carriers 40 on the conveyor 30 as the latter moves upwardly through its upright run 50. Only every fourth carrier is loaded with the double rows 60 in this fashion. As shown in column B of FIG. 14, after the conveyor 30 has moved upwardly sufficiently to leave three empty carriers 40 below the carriers loaded with the double rows 60, double rows 62 are loaded into those carriers 40 which are then opposite the loading points 54. As shown in column C, after the conveyor 30 has moved upwardly three more steps, double rows 64 of containers are loaded at the loading points 54. This process is repeated again and again, as shown in columns B, E, F and G, until, ultimately, all of the carriers moving upwardly out of the loading station 42 are loaded with double rows of containers.

The same loading pattern is utilized for the carriers 38 on the conveyor 28. Also, the carriers 38 and 40 are unloaded in similar patterns at the unloading points 56 and 58.

The foregoing completes a general description of the structure and mode of operation of the invention. Next, a loading apparatus 70 of the invention, for loading the carriers 40 on the conveyor 30 at the loading points 54, will be considered. It will be understood that a similar loading apparatus, not shown, is utilized for loading the carriers 38 on the conveyor 28 at the loading points 52.

Conveyor loading apparatus 70

Referring to FIGS. 2 to 5 of the drawings, the apparatus 70 for loading cans, or other containers, into the carriers 40 on the conveyor 30 includes a frame 72 through which the conveyor 30 moves continuously along its upright run 50, wherein it is laterally separated from the upright run 48 of the conveyor 28. Coaxially mounted on the frame 72 are sprockets 74 engaged with and driven by the respective chains 37 of the conveyor 30. The sprockets 74 drive a camshaft 76 through a gear train 78. The camshaft 76 carries cams, to be described hereinafter, which operate various components of the loading apparatus 70.

The loading apparatus 70 includes three loading means 80, 82 and 84 spaced apart vertically a distance equal to the spacing of every fourth carrier 40, in the particular construction illustrated, to provide the loading pattern hereinbefore discussed in connection with FIG. 14 of the drawings. The loading means 80, 82 and 84 are interconnected to operate in unison and are all identical, wherefore only the loading means 80 will be considered in detail herein.

The loading means 80 includes a generally horizontal conveyor 86, shown as a belt-type conveyor suitably mounted on the frame 72, for conveying a single line of cans 88, or other containers, into a position opposite and parallel to the open sides of the carriers 40 on the main conveyor 30. Adjacent the horizontal conveyor 86, and between it and the main conveyor 30, is a fixed container receiving means or shelf 90 which is suitably mounted on the frame 72 and which is adapted to receive a row of cans 88 pushed thereonto from the conveyor 86 by a pusher means 92. The fixed shelf 90 is at a slightly lower level than the horizontal conveyor 86 to permit the pusher means 92 to push a row of cans 88 thereonto from the conveyor 86, this difference in elevation being considerably exaggerated in FIG. 2 of the drawings.

Between the fixed shelf 90 and the main conveyor 30 is a vertically movable shelf 94 onto which a double row of cans 88 is adapted to be pushed, by the pusher means 92, from the conveyor 86 and the fixed shelf 90, when the movable shelf 94 is in its lowermost position, as shown in FIG. 2 of the drawings. The movable shelf 94, when in its lowermost position, is at a level slightly below that of the fixed shelf 90. Again, this difference in elevation is considerably exaggerated in FIG. 2 of the drawings.

The movable shelf 94 is mounted on an elevator 96 which is vertically movable parallel to and adjacent the main conveyor 30 and which is faced by the open sides of the carriers 40 on such main conveyor. As will be described in more detail hereinafter, the double row of cans 88 formed on the movable shelf 94 is adapted to be pushed into a registering carrier 40 by another pusher means 98, during synchronous upward movement of the main conveyor 30 and the elevator 96. The double row of containers pushed into the registering carrier 40 by the pusher means 98 is supported by a wall 100 of such carrier throughout the upright run 50 of the main conveyor 30.

The elevator 96 is actuated by cams 102, FIGS. 3 and 6, on the camshaft 76 which is driven by the main conveyor 30. The cams 102 engage cam followers 104 on the elevator 96 and are so shaped as to cause the elevator 96 to move upwardly in synchronism with the upward movement of the main conveyor 30, through a predetermined distance, so as to maintain the movable shelf 94 in register with one of the carriers 40. After the cams 102 have displaced the elevator 96 upwardly to the upper limit of its travel, they permit the elevator to return to the lower limit of its travel, as will be apparent. During the upward stroke of the elevator 96, the previously formed double row of cans 88 on the movable shelf 94 is transferred to the registering carrier 40 by the pusher means 98 in a manner to be described.

To insure accurate synchronizing of the upward stroke of the elevator 96 with the concurrent upward movement of the main conveyor 30, and to lessen the load on the cams 102, the elevator and the main conveyor are mechanically interlocked during the upward stroke of the elevator. For this purpose, the elevator is vertically slidable in horizontally movable trucks 106, FIG. 2, carried by the frame 72 and biased away from the main conveyor 30 by springs 108. By moving the elevator 96 and its supporting trucks 106 toward the main conveyor 30 in opposition to the action of the springs 108, locking projections 110 on the elevator are caused to engage the chains 37 of the main conveyor 30 to produce the desired mechanical interlock. Such movement of the elevator 96 toward the main conveyor 30 to achieve the desired mechanical interlock during the upward stroke of the elevator is produced by cams 112, FIGS. 3 and 7, on the camshaft 76. The cams 112 engage cam followers 114 on roller assemblies 116 which are supported on the frame 72 for movement toward and away from the main conveyor 30 and which engage the elevator 96. As will be apparent from FIGS. 6 and 7 of the drawings, as the camshaft 76 rotates through one revolution, the cams 102 produce one complete cycle of vertical movement of the elevator 96 and the cams 112 produce the desired mechanical interlocking of the elevator 96 and the chains 37 of the main conveyor 30 during the upward stroke of the elevator 96. During the downward stroke of the elevator 96, of course, the cams 112 permit the springs 108 acting on the elevator trucks 106 to prevent the mechanical interlock between the elevator and the main conveyor 30.

With the foregoing construction, precise synchronism of the upward movement of the elevator 96 with the upward movement of the main conveyor 30 is achieved to insure accurate registering of the movable shelf 94 on the elevator with one of the container carriers 40 on the main conveyor.

Turning to a more detailed consideration of the pusher means 92, it comprises a pusher bar 118 supported by rods 120 which are suitably mounted on the frame 72 for movement toward and away from the main conveyor 30. Compression springs 122 encircling the rods 120 bias the pusher bar 118 in a direction away from the main conveyor 30, and into a retracted position on the side of the horizontal conveyor 86 opposite the main conveyor 30. The rods 120 are connected to a frame 124 which, incidentally, interconnects the pusher means 92 and corresponding pusher means of the loading means 82 and 84. Levers 126 are pivotally connected at their upper ends to the vertical centerline of the pusher frame 124 and are pivotally connected at their lower ends to the main frame 72. The levers 126 are pivotally connected intermediate their ends to links 128 slidably mounted on the main frame 72 for movement toward and away from the main conveyor 30. The links 128 carry cam followers 130 which engage cams 132, FIGS. 3 and 8, on the camshaft 76. The cams 132 have diametrically opposite lobes 134 and 136 which, acting through the intervening mechanism just described, are adapted to move the pusher bar 118 different distances toward the main conveyor 30. More particularly, the smaller lobes 134 on the cams 132 displace the pusher bar 118 from its retracted position across the horizontal conveyor 86 to a first extended position. This results in shifting of a row of cans 88 from the conveyor 86 to the fixed shelf 90. The larger lobes 136 on the cams 132 displace the pusher bar 118 from its retracted position across the conveyor 86 and the fixed shelf 90 to a second extended position. This results in displacement of a double row of cans 88 from the conveyor 86 and the fixed shelf 90 onto the movable shelf 94 on the elevator 96. It will be understood, of course, that the cams 132 are so related to the cams 102 and 112 as to effect the transfer of a double row of cans 88 from the conveyor 86 and the fixed shelf 90 to the movable shelf 94 only when the elevator 96 is at the lower limit of its travel. However, the smaller lobes 134 on the cams 132 displaces a row of cans 88 from the conveyor 86 to the fixed shelf 90 while the elevator 96 is displaced upwardly from its lower position.

As best shown in FIG. 4 of the drawings, the pusher bar 118 is provided at its downstream end with a stop 138 which limits the travel of the single line of cans 88 on the horizontal conveyor 86 when the pusher bar is in its retracted position. The horizontal conveyor 86 preferably operates continuously and merely slides under the line of cans under such conditions. The pusher bar 118 is provided at its upstream end with a stop 140 which similarly intercepts the single line of cans on the horizontal conveyor 86 when the pusher bar is moved into its first extended position to displace a row of cans onto the fixed shelf 90, and also when it is in its second extended position to displace a double row of cans onto the movable shelf 94 of the elevator 96. Thus, the length of the double row of cans formed by the pusher bar 118 is determined by the distance between the downstream and upstream stops 138 and 140.

To prevent the continuously operating conveyor 86 from buckling the line of cans 88 thereon when such line is intercepted by the downstream stop 138, the line of cans is confined between the pusher bar 118 and a guard 142 shown as projectible upwardly between the conveyor 86 and the fixed shelf 90. The guard 142 is carried by a guard frame 144 which is mounted on the main frame 72 for vertical movement relative thereto. The guard frame 144 is provided thereon with cam followers 146 engaging cams 148 on the camshaft 76. The cams 148 are double-lobed cams which project the guard 142 upwardly twice per revolution of the camshaft 76, i.e., each time the pusher bar 118 is in its retracted position so that the downstream stop 138 intercepts the single line of cans on the conveyor 86. As previously explained, this latter occurs twice per revolution of the camshaft 76 because of the two lobes 134 and 136 on the cams 132 controlling the pusher bar.

In order to prevent buckling of the single line of cans 88 on the horizontal conveyor 86 when such line is intercepted by the upstream stop 140, the conveyor 86 may be provided with fixed guards, not shown, on both sides thereof. Such fixed guards would confine the single line of cans on the continuously moving conveyor 86 in much the same manner as the pusher bar 118 and the guard 142 confine the line of cans when it is intercepted by the downstream stop 138.

The pusher means 98 for transferring each double row of cans 88 from the movable shelf 94 to a registering carrier 40 comprises a pusher bar 150 connected at its ends to the lower ends of depending parallelogram or pantograph linkages 152 which are mounted on the main frame 72 at their upper ends. Gravity normally urges the pusher bar 150 into a retracted position, shown in FIG. 2 of the drawings. Downward swinging movement of the parallelogram linkages 152 beyond positions corresponding to the retracted position of the pusher bar 150 is prevented by stops 154.

As will be apparent, upward swinging movement of the parallelogram linkages 152 produces upward movement of the pusher bar 150 and simultaneous horizontal movement thereof, in a direction toward the main conveyor 30, from its retracted position into an extended position. This compound motion of the pusher bar 150 permits it to move upwardly with the rising elevator 96 and main conveyor 30 as it moves horizontally from its retracted position into its extended position to push a double row of cans 88 from the movable shelf 94 into a registering carrier 40, which is an important feature.

Another important feature of the invention is that the desired compound movement of the pusher bar 150 is produced by the elevator 96 itself. More particularly, the pusher bar 150 is provided at its ends with rollers 156 which engage tracks 158, FIGS. 4 and 5, at the ends of the movable shelf 94 on the elevator. Thus, as the elevator 96 rises, the tracks 158 at the ends of the movable shelf 94 thereon engage the rollers 156 to elevate the pusher bar 150 concurrently with the elevator and the main conveyor 30. The parallelogram linkages 152 simultaneously cause the pusher bar 150 to move horizontally from its retracted position to its extended position to sweep a double row of cans 88 on the movable shelf 94 into the registering carrier 40. Thus, a simple and effective means of transferring the double row of cans from the movable shelf 94 into the registering carrier 40 is provided.

*Operation of loading apparatus 70*

It is thought that the operation of the apparatus 70 will be clear from the foregoing description of the structure thereof. However, its operation will be summarized briefly in this section of the present specification, with reference to FIGS. 10 to 13 of the drawings.

As shown in FIG. 10, the pusher bar 118 has transferred a first row of cans 160 onto the fixed shelf 90, and has returned to its retracted position. The line of cans on the conveyor 86 is moving toward the downstream 138. The guard 142 has returned to its extended position, and the elevator 96 is returning to its lower position.

Turning to FIG. 11, the pusher bar 118 is still in its retracted position, the line of cans on the conveyor 86 being intercepted by the downstream stop 138. The guard 142 is still extended to confine a second row 162 of cans between the pusher bar 118 and the guard. The elevator 96 has returned to its lower position and the pusher means 98 to its retracted position.

Turning to FIG. 12, the guard 142 has been retracted, and the pusher bar 118 has been moved into its second extended position, by the larger lobes 136 on the cams 132, to displace the first and second rows 160 and 162 from the conveyor 86 and the fixed shelf 90 onto the movable shelf 94. The line of cans on the conveyor 86 is now intercepted by the upstream stop 140.

After the transfer of the rows 160 and 162 onto the movable shelf 94, the cams 122 start the elevator 96 upwardly and the cams 112 interlock the elevator and the main conveyor 30, with one of the carriers 40 in register with the movable shelf 94. This condition is shown in FIG. 13 of the drawings. As the elevator 96 moves upwardly in synchronism with the conveyor 30, the tracks 158 at the ends of the movable shelf 94 engage the rollers 146 on the pusher bar 150 to cause this pusher bar to sweep the two can rows 160 and 162 from the movable shelf 94 into the registering container carrier 40, as shown in FIG. 13. Subsequently, the elevator 96 is returned to its lower position in readiness for the next cycle.

As shown in FIG. 13, while the rows 160 and 162 are being transferred to one of the carriers 40, the pusher means 92 is transferring another row of cans to the fixed shelf 90. Thus, by the time the elevator 96 returns to its lower position, as shown in FIG. 11, everything will be in readiness for the pusher means 92 to sweep two more rows of cans onto the movable shelf 94, as shown in FIG. 12, for a repetition of the cycle described.

*Unloading apparatus 170*

In FIGS. 16 and 17 of the drawings is shown an apparatus 170, for unloading one of the carriers 40 on the main conveyor 30, which is generally similar to the loading apparatus 70, but which operates in a reverse manner. In view of this similarity, corresponding parts of the unloading apparatus 170 will be identified by reference numerals higher by one hundred than the reference numerals utilized in conjunction with the loading apparatus 70.

In the unloading apparatus 170, a pusher means 198 is located on the rear side of the carrier 40 and includes a pusher bar 250 which is insertable into the carrier through a slot 251 in the rear wall of the carrier. The pusher bar 250 is carried by parallelogram linkages 252 coresponding to the linkages 152, and is provided with rollers 256 engageable with tracks 258 on an elevator 196. The elevator carries a movable shelf 194 on the front side of the main conveyor 30, this shelf being maintained in register with the carrier 40 during upward movement of the main conveyor 30 and the elevator 196 by a mechanical synchronizing system similar to that hereinbefore described.

As will be apparent, during synchronous upward movement of the main conveyor 30 and the elevator 196, the tracks 258 engage the rollers 256 to cause the parallelogram linkages 252 to move the pusher bar 250 horizontally from a retracted position to an extended position. In so doing, the pusher bar 250 displaces a double row of cans in the carrier 40 onto the shelf 194. Subsequently, the double row of cans may be removed from the shelf 194, either as a unit, or a row at a time, in any suitable manner.

Although exemplary embodiments of the invention have been described herein for purposes of illustration, it will be understood that various changes, modifications and substitutions may be incorporated in such embodiments without departing from the spirit of the invention as defined by the claims which follow.

I claim:
1. In a conveyor system, the combination of:
   (a) a conveyor movable through an upright run;
   (b) container carriers spaced apart along and mounted on said conveyor;
   (c) each of said container carriers having a container supporting wall which is substantially horizontal and faces upwardly during movement of said conveyor through said upright run thereof;
   (d) an elevator adjacent and movable parallel to said upright run of said conveyor;
   (e) said elevator having vertically spaced generally horizontal, container supporting shelves respectively registerable with certain of said container supporting walls during movement of said conveyor through said upright run thereof;
   (f) means for loading containers onto said container supporting shelves in one position of said elevator;
   (g) means for moving said elevator in synchronism with movement of said conveyor through said upright run thereof, and with said container supporting shelves respectively in register with certain of said container supporting walls; and
   (h) means for simultaneously transferring the containers from said container supporting shelves to said container supporting walls respectively in register therewith, during such synchronized movement of said elevator and said conveyor.

2. In a conveyor system, the combination of:
   (a) a conveyor movable through an upright run;
   (b) container carriers spaced apart along and mounted on said conveyor;
   (c) each of said container carriers having a container supporting wall which is substantially horizontal and faces upwardly during movement of said conveyor through said upright run thereof;
   (d) an elevator adjacent and movable parallel to said upright run of said conveyor;
   (e) said elevator having a generally hoirzontal, container supporting shelf registerable with one of said container supporting walls during movement of said conveyor through said upright run thereof;
   (f) means for loading containers onto said container supporting shelf in one position of said elevator;
   (g) means for moving said elevator in synchronism with movement of said conveyor through said upright run thereof, and with said container supporting shelf in register with one of said container supporting walls, including interengageable means on said elevator and said conveyor for directly locking said elevator and said conveyor together; and
   (h) means for transferring the containers from said container supporting shelf to said container supporting wall which is in register therewith, during such synchronized movement of said elevator and said conveyor.

3. In a conveyor system, the combination of:
   (a) a conveyor movable through an upright run;
   (b) container carriers spaced apart along and mounted on said conveyor;
   (c) each of said container carriers having a container supporting wall which is substantially horizontal and faces upwardly during movement of said conveyor through said upright run thereof;
   (d) an elevator adjacent and movable parallel to said upright run of said conveyor;
   (e) said elevator having a generally horizontal, container supporting shelf registerable with one of said container supporting walls during movement of said conveyor through said upright run thereof;
   (f) means for loading containers onto said container supporting shelf in one position of said elevator;
   (g) means for moving said elevator in synchronism with movement of said conveyor through said upright run thereof, and with said container supporting shelf in register with one of said container supporting walls; and
   (h) transfer means actuable by said elevator for transferring the containers from said container supporting shelf to said container supporting wall which is in register therewith, during such synchronized movement of said elevator and said conveyor.

4. In a conveyor system, the combination of:
   (a) a conveyor movable through an upright run;
   (b) container carriers spaced apart along and mounted on said conveyor;
   (c) each of said container carriers having a container supporting wall which is substanitally horizontal and faces upwardly during movement of said conveyor through said upright run thereof;
   (d) an elevator adjacent and movable parallel to said upright run of said conveyor;
   (e) said elevator having a generally horizontal, container supporting shelf registerable with one of said container supporting walls during movement of said conveyor through said upright run thereof;
   (f) means for loading containers onto said container supporting shelf in one position of said elevator;
   (g) means for moving said elevator in synchronism with movement of said conveyor through said upright run thereof, and with said container supporting shelf in register with one of said container supporting walls;
   (h) transfer means actuable by said elevator for transferring the containers from said container supporting shelf to said container supporting wall which is in register therewith, during such synchronized movement of said elevator and said conveyor; and
   (i) said transfer means including pusher means movable laterally across said container supporting shelf, and including means engageable with said elevator for so moving said pusher means.

5. In a conveyor system, the combination of:
   (a) a conveyor movable through an upright run;
   (b) container carriers spaced apart along and mounted on said conveyor;
   (c) each of said container carriers having a container supporting wall which is substantially horizontal and faces upwardly during movement of said conveyor through said upright run thereof;
   (d) an elevator adjacent and movable parallel to said upright run of said conveyor;
   (e) said elevator having a generally horizontal, container supporting shelf registerable with one of said container supporting walls during movement of said conveyor through said upright run thereof;
   (f) means for loading containers onto said container supporting shelf in one position of said elevator;
   (g) means for moving said elevator in synchronism with movement of said conveyor through said upright run thereof, and with said container supporting shelf in register with one of said container supporting walls;
   (h) transfer means actuable by said elevator for transferring the containers from said container supporing shelf to said container supporting wall which is in register therewith, during such synchronized movement of said elevator and said conveyor;
   (i) said transfer means including pusher means movable laterally across said container supporting shelf, and including means engageable with said elevator for so moving said pusher means; and (j) said transfer means including parallelogram linkage means supporting said pusher means.

6. In a conveyor system, the combination of:
(a) a conveyor movable through an upright run;
(b) container carriers spaced apart along and mounted on said conveyor;
(c) each of said container carriers having a container supporting wall which is substantially horizontal and faces upwardly during movement of said conveyor through said upright run thereof;
(d) an elevator adjacent and movable parallel to said upright run of said conveyor;
(e) said elevator having vertically spaced, generally horizontal, container supporting shelves each registerable with one of said container supporting walls during movement of said conveyor through said upright run thereof;
(f) means for loading containers onto said container supporting shelves in one position of said elevator;
(g) means for moving said elevator in synchronism with movement of said conveyor through said upright run thereof, and with each of said container supporting shelves in register with one of said container supporting walls, including interengageable means on said elevator and said conveyor for directly locking said elevator and said conveyor together; and
(h) means for simultaneously transferring the containers from said container supporting shelves to said container supporting walls which are in register therewith, respectively, during such synchronized movement of said elevator and said conveyor.

7. In a conveyor system, the combination of:
(a) a conveyor movable through an upright run;
(b) container carriers spaced apart along and mounted on said conveyor;
(c) each of said container carriers having a container supporting wall which is substantially horizontal and faces upwardly during movement of said conveyor through said upright run thereof;
(d) means for moving a line of upright containers into a position adjacent said upright run of said conveyor;
(e) means for moving a first row of said upright containers laterally from said line;
(f) means for moving a second row of said upright containers laterally from said line and against said first row to form a double row of said upright containers; and
(g) means for transferring said double row of upright containers to one of said container supporting walls during movement of said conveyor through said upright run thereof.

8. In a conveyor system, the combination of:
(a) a generally horizontal conveyor adapted to convey a line of containers;
(b) container supporting means paralleling said conveyor on one side thereof;
(c) container receiving means between said conveyor and said supporting means;
(d) pusher means movable laterally across said conveyor from a retracted position on the other side of said conveyor to a first extended position, and movable laterally across said conveyor and said receiving means from said retracted position to a second extended position;
(e) means for moving said pusher means from said retracted position to said first extended position, so as to push a first row of containers from said line on said conveyor onto said receiving means, and for then returning said pusher means to said retracted position;
(f) means for subsequently moving said pusher means from said retracted position to said second extended position, so as to push a second row of containers from said line on said conveyor across said receiving means onto said supporting means, and so as to push said first row of containers from said receiving means onto said supporting means ahead of said first row to form a double row of containers on said supporting means, and for then returning said pusher means to said retracted position;
(g) a second conveyor movable through an upright run adjacent said supporting means;
(h) container carriers spaced apart along and mounted on said second conveyor; and
(i) means for transferring said double row of containers from said supporting means to one of said container carriers during movement of said second conveyor through said upright run thereof.

9. In a conveyor system, the combination of:
(a) a generally horizontal conveyor adapted to convey a line of containers;
(b) container supporting means paralleling said conveyor on one side thereof;
(c) container receiving means between said conveyor and said supporting means;
(d) pusher means movable laterally across said conveyor from a retracted position on the other side of said conveyor to a first extended position, and movable laterally across said conveyor and said receiving means from said retracted position to a second extended position;
(e) means for moving said pusher means from said retracted position to said first extended position, so as to push a first row of containers from said line on said conveyor onto said receiving means, and for then returning said pusher means to said retracted position; and
(f) means for subsequently moving said pusher means from said retracted position to said second extended position, so as to push a second row of containers from said line on said conveyor across said receiving means onto said supporting means, and so as to push said first row of containers from said receiving means onto said supporting means ahead of said first row to form a double row of containers on said supporting means, and for then returning said pusher means to said retracted position.

10. In a conveyor system, the combination of:
(a) a generally horizontal conveyor adapted to convey a line of containers;
(b) container supporting means paralleling said conveyor on one side thereof;
(c) container receiving means between said conveyor and said supporting means;
(d) pusher means having upstream and downstream ends and movable laterally across said conveyor from a retracted position on the other side of said conveyor to a first extended position, and movable laterally across said conveyor and said receiving means from its retracted position to a second extended position;
(e) means for moving said pusher means from its retracted position to its first extended position, so as to push a first row of containers from said line on said conveyor onto said receiving means, and for then returning said pusher means to its retracted position;
(f) means for subsequently moving said pusher means from its retracted position to its second extended position, so as to push a second row of containers from said line on said conveyor across said receiving means onto said supporting means, and so as to push said first row of containers from said receiving means onto said supporting means ahead of said first row to form a double row of containers on said supporting means, and for then returning said pusher means to its retracted position;
(g) stop means on said pusher means at said downstream end thereof for preventing movement of said line of containers on said conveyor past said downstream end of said pusher means; and (h) stop means on said pusher means at said upstream end thereof for intercepting said line of containers on said conveyor when said pusher means is in either of its extended positions.

11. In a conveyor system, the combination of:
(a) a generally horizontal conveyor adapted to convey a line of containers;
(b) container supporting means paralleling said conveyor on one side thereof;
(c) container receiving means between said conveyor and said supporting means;
(d) pusher means having upstream and downstream ends and movable laterally across said conveyor from a retracted position on the other side of said conveyor to a first extended position, and movable laterally across said conveyor and said receiving means from its retracted position to a second extended position;
(e) means for moving said pusher means from its retracted position to its first extended position, so as to push a first row of containers from said line on said conveyor onto said receiving means, and for then returning said pusher means to its retracted position;
(f) means for subsequently moving said pusher means from its retracted position to its second extended position, so as to push a second row of containers from said line on said conveyor across said receiving means onto said supporting means, and so as to push said first row of containers from said receiving means onto said supporting means ahead of said first row to form a double row of containers on said supporting means, and for then returning said pusher means to its retracted position;
(g) stop means for preventing movement of said line of containers on said conveyor past said downstream end of said pusher means;
(h) stop means on said pusher means at said upstream end thereof for intercepting said line of containers on said conveyor when said pusher means is in either of its extended positions;
(i) a guard movable from a retracted position into an extended position wherein it is interposed between said receiving means and said conveyor to confine said line of containers on said conveyor between said pusher means and said guard; and
(j) means for moving said guard into its extended position in response to movement of said pusher means into its retracted position, and for moving said guard into its retracted position prior to movement of said pusher means from its retracted position toward either of its extended positions.

12. In a conveyor system, the combination of:
(a) a generally horizontal conveyor adapted to convey a line of containers;
(b) container supporting means paralleling said conveyor on one side thereof;
(c) container receiving means between said conveyor and said supporting means;
(d) pusher means having upstream and downstream ends and movable laterally across said conveyor from a retracted position on the other side of said conveyor to a first extended position, and movable laterally across said conveyor and said receiving means from its retracted position to a second extended position;
(e) means for moving said pusher means from its retracted position to its first extended position, so as to push a first row of containers from said line on said conveyor onto said receiving means, and for then returning said pusher means to its retracted position;

(f) means for subsequently moving said pusher means from its retracted position to its second extended position, so as to push a second row of containers from said line on said conveyor across said receiving means onto said supporting means, and so as to push said first row of containers from said receiving means onto said supporting means ahead of said first row to form a double row of containers on said supporting means, and for then returning said pusher means to its retracted position;
(g) a guard movable from a retracted position into an extended position wherein it is interposed between said receiving means and said conveyor to confine said line of containers on said conveyor between said pusher means and said guard; and
(h) means for moving said guard into its extended position in response to movement of said pusher means into its retracted position, and for moving said guard into its retracted position prior to movement of said pusher means from its retracted position toward either of its extended positions.

13. In a conveyor system, the combination of:
(a) a conveyor movable through an upright run;
(b) container carriers spaced apart along and mounted on said conveyor;
(c) an elevator adjacent and movable parallel to said upright run of said conveyor;
(d) said elevator having a generally horizontal, container supporting shelf registerable with one of said container carriers during movement of said conveyor through said upright run thereof;
(e) means for moving said elevator in synchronism with movement of said conveyor through said upright run thereof, and with said container supporting shelf in register with one of said container carriers, including interengageable means on said elevator and said conveyor for directly locking said elevator and said conveyor together; and
(f) means for transferring containers between said container supporting shelf and said container carrier which is in register therewith, during such synchronized movement of said elevator and said conveyor.

14. In a conveyor system, the combination of:
(a) a conveyor movable through an upright run;
(b) container carriers spaced apart along and mounted on said conveyor;
(c) an elevator adjacent and movable parallel to said upright run of said conveyor;
(d) said elevator having a generally horizontal, container supporting shelf registerable with one of said container carriers during movement of said conveyor through said upright run thereof;
(e) means for moving said elevator in synchronism with movement of said conveyor through said upright run thereof, and with said container supporting shelf in register with one of said container carriers;
(f) transfer means actuable by said elevator for transferring containers between said container supporting shelf and said container carrier which is in register therewith, during such synchronized movement of said elevator and said conveyor; and
(g) said transfer means including laterally-movable pusher means and including means engageable with said elevator for moving said pusher means.

References Cited by the Examiner
UNITED STATES PATENTS

| | | | |
|---|---|---|---|
| 1,194,350 | 8/16 | Beers | 198—20 X |
| 2,381,502 | 8/45 | Lang | 198—20 X |
| 3,051,292 | 8/62 | Sundquist | 198—24 X |

SAMUEL F. COLEMAN, *Primary Examiner.*

EDWARD A. SROKA, *Examiner.*